(12) United States Patent
Stauffer et al.

(10) Patent No.: US 10,483,898 B1
(45) Date of Patent: Nov. 19, 2019

(54) MOTOR CONTROL SYSTEM FOR ELECTRIC MOTOR AND METHOD OF USE

(71) Applicant: REGAL BELOIT AMERICA, INC., Beloit, WI (US)

(72) Inventors: Zachary Joseph Stauffer, Fort Wayne, IN (US); Luis D. Morales, Fort Wayne, IN (US); Oscar A. Guevara, Valparaiso, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/966,614

(22) Filed: Apr. 30, 2018

(51) Int. Cl.
| | |
|---|---|
| *H02P 27/06* | (2006.01) |
| *F04D 25/08* | (2006.01) |
| *F04D 25/06* | (2006.01) |

(52) U.S. Cl.
CPC .............. *H02P 27/06* (2013.01); *F04D 25/06* (2013.01); *F04D 25/08* (2013.01); *H02P 2201/11* (2013.01)

(58) Field of Classification Search
CPC ...................................................... H02P 27/06
USPC .................................. 318/400.3, 400.01, 700
See application file for complete search history.

(56) References Cited

U.S. PATENT DOCUMENTS

| | | | |
|---|---|---|---|
| 3,913,002 A | 10/1975 | Steigerwald et al. | |
| 3,959,714 A | 5/1976 | Mihelich | |
| 4,074,344 A | 2/1978 | Pitel | |
| 4,816,982 A | 3/1989 | Severinsky | |
| 4,943,902 A | 7/1990 | Severinsky | |
| 5,003,456 A | 3/1991 | Forge | |
| 5,192,906 A | 3/1993 | Nathan | |
| 6,052,790 A | 4/2000 | Brown | |
| 6,329,636 B1 | 12/2001 | Geissler | |
| 6,791,853 B2 | 9/2004 | Afzal et al. | |
| 7,643,322 B1 | 1/2010 | Varga et al. | |
| 8,981,699 B2 * | 3/2015 | Obata ................ | G01R 31/1227 318/490 |
| 9,007,002 B2 * | 4/2015 | Niizuma ............... | H02P 27/085 318/139 |
| 9,844,310 B2 * | 12/2017 | Reed ...................... | A47L 9/0411 |
| 2010/0109617 A1 | 5/2010 | Erdl | |
| 2014/0266011 A1 | 9/2014 | Mehta et al. | |
| 2015/0207339 A1 | 7/2015 | Hamburgen et al. | |

FOREIGN PATENT DOCUMENTS

| | | |
|---|---|---|
| DE | 102005002359 C5 | 10/2015 |
| JP | H11127576 A | 5/1999 |
| JP | 2002160060 A | 6/2002 |

* cited by examiner

*Primary Examiner* — David Luo
(74) *Attorney, Agent, or Firm* — Armstrong Teasdale LLP

(57) ABSTRACT

A motor control system for operating an electric motor is described. The motor control system includes a power supply module disposed external to the electric motor and configured to convert an alternating current (AC) voltage at a first level to a direct current (DC) voltage at a second level lower than a DC-equivalent voltage of the AC voltage at the first level, and a motor control assembly coupled to the electric motor. The motor control assembly includes an input power connector configured to receive the DC voltage at the second level from the power supply module. The motor control assembly also includes an inverter module coupled to the input power connector. The inverter module is configured to convert the DC voltage at the second level to an AC motor voltage to operate the electric motor.

20 Claims, 5 Drawing Sheets

MOTOR CONTROL SYSTEM FOR ELECTRIC MOTOR AND METHOD OF USE

BACKGROUND

The field of the invention relates generally to electric motors, and more particularly, to a motor control system having a remote power supply module for stepping down line voltage to a rated DC voltage and a method of use.

Electric motors are utilized in various fluid handling applications, including heating, ventilation, and air conditioning (HVAC) appliances (furnaces, heat pumps, and air conditioners). For example, an electric motor drives a rotating component (e.g., a fan, blower, or impeller) to generate a fluid flow through an appliance. Many known electric motors include a motor control assembly that contains various electronic components for conditioning power for the electric motor, controlling the electric motor, and carrying out communication between the electric motor and other components of the appliance. Typical motor control assemblies are large relative to the electric motor itself, sometimes extending the length of the motor assembly by as much as 50%. Such motor control assemblies can impede fluid flow, which reduces efficiency and increases the cost of operating and maintaining the electric motor.

In addition, electric motors operate in locations having respective power sources with differing voltages available. For instance, in North America, three common input line voltages available to power HVAC motor controllers are 230V, 460V, and 600V (±5-15%). Various spacing, sizing, and rating standards apply to motor controllers based on the input line voltage, and, generally, motors that are powered with higher line voltages are larger and more expensive to build and to purchase. Accordingly, motors that are rated for certain applications cannot be powered with line voltages above a particular level. In such situations, the end users of the motor must either implement larger and more expensive motors that accept the higher input line voltage, or must purchase and install transformers to step-down the line voltage. Such transformers, however, can be expensive, bulky, and inefficient.

BRIEF DESCRIPTION

In one aspect, a motor control system for operating an electric motor is provided. The motor control system includes a power supply module disposed external to the electric motor and configured to convert an alternating current (AC) voltage at a first level to a direct current (DC) voltage at a second level lower than a DC-equivalent voltage of the AC voltage at the first level, and a motor control assembly coupled to the electric motor. The motor control assembly includes an input power connector configured to receive the DC voltage at the second level from the power supply module. The motor control assembly also includes an inverter module coupled to the input power connector. The inverter module is configured to convert the DC voltage at the second level to an AC motor voltage to operate the electric motor.

In another aspect, a method of operating an electric motor for a heating, ventilation, and air conditioning (HVAC) appliance is provided. The method includes converting an input alternating current (AC) voltage at a first level to a direct current (DC) voltage at a second level lower than a DC-equivalent voltage of the AC voltage at the first level at a power supply module located remotely with respect to the electric motor. The method also includes transmitting the DC voltage at the second level through an input power connector to an inverter module, the input power connector and the inverter module disposed on the electric motor. The method further includes converting, by the inverter module, the DC voltage at the second level to an AC motor voltage, and operating the electric motor using the AC motor voltage.

In yet another aspect, a fluid-moving system is provided. The fluid-moving system a power supply module configured to convert an alternating current (AC) voltage at a first level to a direct current (DC) voltage at a second level lower than a DC-equivalent voltage of the AC voltage at the first level. The fluid-moving system also includes an electric motor configured to turn a rotating component to generate a fluid flow, and a motor control assembly coupled to the electric motor. The motor control assembly includes an input power connector configured to receive the DC voltage at the second level from the power supply module. The motor control assembly also includes an inverter module coupled to the input power connector, the inverter module configured to convert the DC voltage at the second level to an AC motor voltage to operate the electric motor.

DETAILED DESCRIPTION

Figure 1:
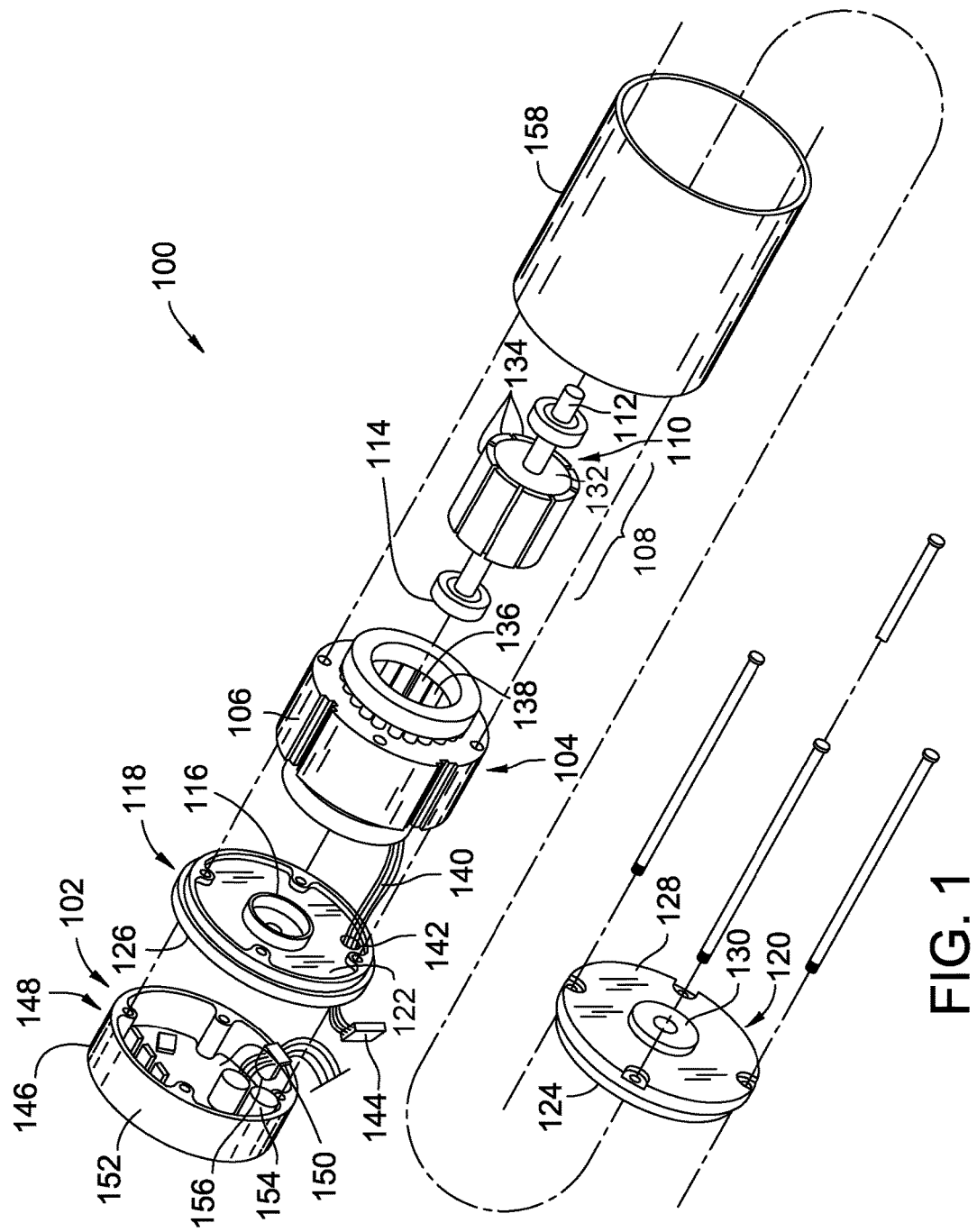
FIG. 1 is an exploded view of an exemplary electric motor.

In the following specification and the claims, a number of terms are referenced that have the following meanings.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the electric motors and electric motor control systems described herein provide a modular-packaged control system for fluid-moving systems such as HVAC appliances. More specifically, the modular-packaged control system separates the control system into two discrete housings.

One housing includes an inverter module and a second housing includes a power supply module that serves as a front-end to the electric motor. The power supply module generally includes electrical components to convert and condition AC power from a power source to DC power to operate the electric motor. More particularly, in the example embodiment, the power supply module includes a step-down or buck converter to convert high-voltage input power to lower-voltage DC power that is supplied to power the motor. The electrical components of the power supply module may include passive and/or active electrical components, including, for example, an isolate power supply such as a resonant converter, or a digital signal processor (DSP).

The other housing contains the inverter module, including active components, such as, for example, power switches, one or more processors or digital signal processors (DSPs), and a communication module to facilitate communication between the inverter module and one or more remote components (e.g., a system controller). The communication module may include a wired or wireless communication module, such that wired or wireless communication is facilitated. Wired signals may include, but are not limited to, discrete, serial, parallel, analog, and/or digital communication, and/or any other known types of wired signals. Wireless signals may include, but are not limited to, Bluetooth, Bluetooth low energy, near field communications (NFC), infrared, and/or any other known types of wireless signals. In some embodiments, using wireless communication to communicate with external devices enables elimination of hardwired communication connectors, and, as such enables a reduction in the size of the motor control assembly housing the inverter module. The components of the inverter module generally fail at a higher rate than the components of the power supply module.

Modular packaging of the inverter module and power supply module enables replacement of the modules separately. The inverter module and its housing are located on the electric motor within a motor control assembly or "motor housing." The power supply module may be located within or external to fluid-moving system, but at least remote from the electric motor itself, thus reducing the size requirements of the motor control assembly and, thereby, impedance of airflow. The motor control assembly and the various control circuitry components therein may be rated, sized, spaced, or otherwise oriented according to lower-voltage standards while accepting a higher-voltage input power supply. Moreover, by locating the power supply module remotely, the heat-generating components therein are separated from the more heat-sensitive components within the motor control assembly. In addition, by housing the step-down converter in the power supply module, any motor control circuitry is isolated from the high-voltage power supply input. Additional benefits of the remote power supply module described herein may include loss-of-phase detection, light load throttle back, improved power factor (active/passive power factor correction), embedded EMC/electromagnetic interference (EMI) protection, and/or line isolation (e.g., using a resonant converter design). One or more of the above-described benefits may be realized based on the specific arrangement of components and/or the specific components used in the implementation of the motor control system described herein.

FIG. 1 is an exploded view of an exemplary electric motor 100. Motor 100 includes control system 102, a stationary assembly 104 including a stator or core 106, and a rotatable assembly 108 including a rotor 110 and a shaft 112. In the exemplary embodiment, motor 100 is utilized to turn a rotating component (e.g., a fan, blower, and/or impeller) in a fluid (e.g., water, air, etc.) moving system. For example, electric motor 100 may be utilized in a clean room filtering system, a fan filter unit, a variable air volume system, a refrigeration system, a pool/spa pump unit, a furnace system, an air conditioning system, and/or a residential or commercial heating, ventilation, and air conditioning (HVAC) system. Alternatively, motor 100 may be implemented in any application that enables motor 100 to function as described herein. Motor 100 may also be used to drive mechanical components other than a fan, blower, and/or impeller, including mixers, gears, conveyors, and/or treadmills. In the exemplary embodiment, control system 102 is integrated with motor 100. Alternatively, motor 100 may be external to and/or separate from control system 102.

Rotor 110 is mounted on and keyed to shaft 112 journaled for rotation in conventional bearings 114. Bearings 114 are mounted in bearing supports 116 integral with a first end member 118 and a second end member 120. End members 118 and 120 have inner facing sides 122 and 124 between which stationary assembly 104 and rotatable assembly 108 are located. Each end member 118 and 120 has an outer side 126 and 128 opposite its inner side 122 and 124. Additionally, second end member 120 has an aperture 130 for shaft 112 to extend through outer side 128.

Rotor 110 comprises a ferromagnetic core 132 and is rotatable within stator 106. Segments 134 of permanent magnet material, each providing a relatively constant flux field, are secured, for example, by adhesive bonding to rotor core 132. Segments 134 are magnetized to be polarized radially in relation to rotor core 132 with adjacent segments 134 being alternately polarized as indicated. While magnets on rotor 110 are illustrated for purposes of disclosure, it is contemplated that other rotors having different constructions and other magnets different in number, construction, and flux fields may be utilized with such other rotors within the scope of the invention.

Stationary assembly 104 comprises a plurality of winding stages 136 adapted to be electrically energized to generate an electromagnetic field. Stages 136 are coils of wire wound around teeth 138 of laminated stator core 106. Winding terminal leads 140 are brought out through an aperture 142 in first end member 118 terminating in a motor connector 144. While stationary assembly 104 is illustrated for purposes of disclosure, it is contemplated that other stationary assemblies of various other constructions having different shapes and/or configurations may be utilized within the scope of the disclosure, such as a stationary assembly usable with an axial flux motor.

Motor 100 further includes an electronics enclosure 146 that mounts on the rear portion of motor 100 to house control system 102. Electronics enclosure 146 and control system 102 may sometimes be referred to collectively as a motor control assembly 148. Electronics enclosure 146 includes a bottom wall 150 and a substantially annular side wall 152. Control system 102 includes a plurality of electronic components 154 and a connector 156 mounted within electronics enclosure 146. Control system 102 is connected to winding stages 136 by interconnecting motor connector 144. Control system 102 applies a voltage to one or more of winding stages 136 at a time for commutating winding stages 136 in a preselected sequence to rotate rotatable assembly 108 about an axis of rotation. In an alternative embodiment, control system 102 is remotely positioned from and communicatively coupled to motor 100. In another alternative embodiment, control system 102 is a central control system for more than one electric motor (e.g., in an HVAC system), and is communicatively coupled to motor 100.

A casing 158 is positioned between first end member 118 and second end member 120 to facilitate enclosing and protecting stationary assembly 104 and rotatable assembly 108.

Figure 2:
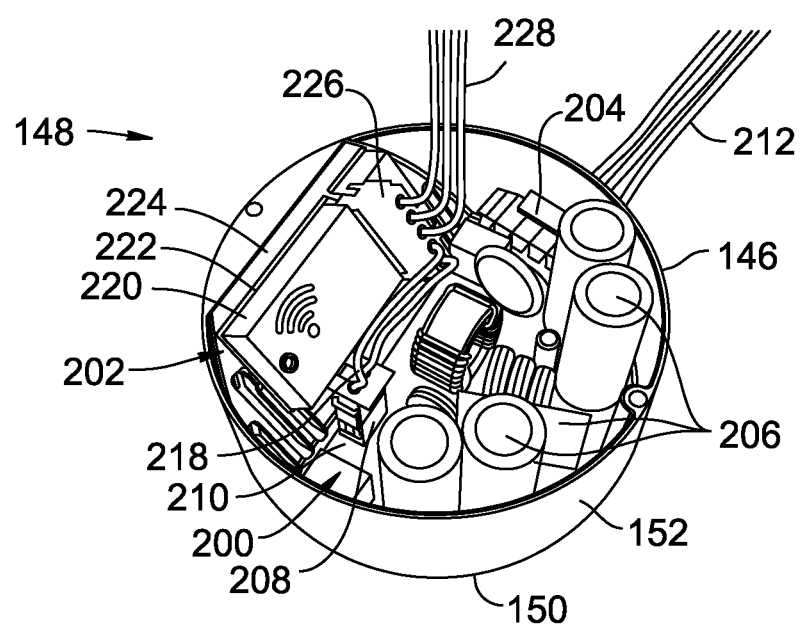
FIG. 2 is a perspective view of the known motor control assembly shown in FIG. 1.
Figure 3:
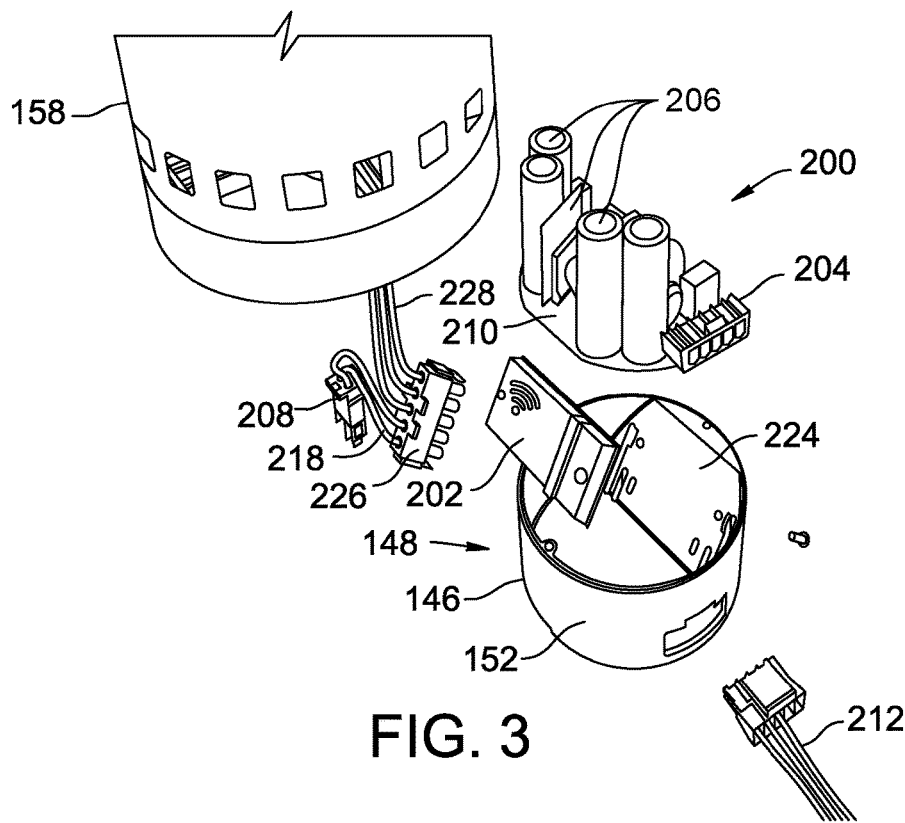
FIG. 3 is an exploded perspective view of the known motor control assembly shown in FIGS. 1 and 2.
Figure 4:
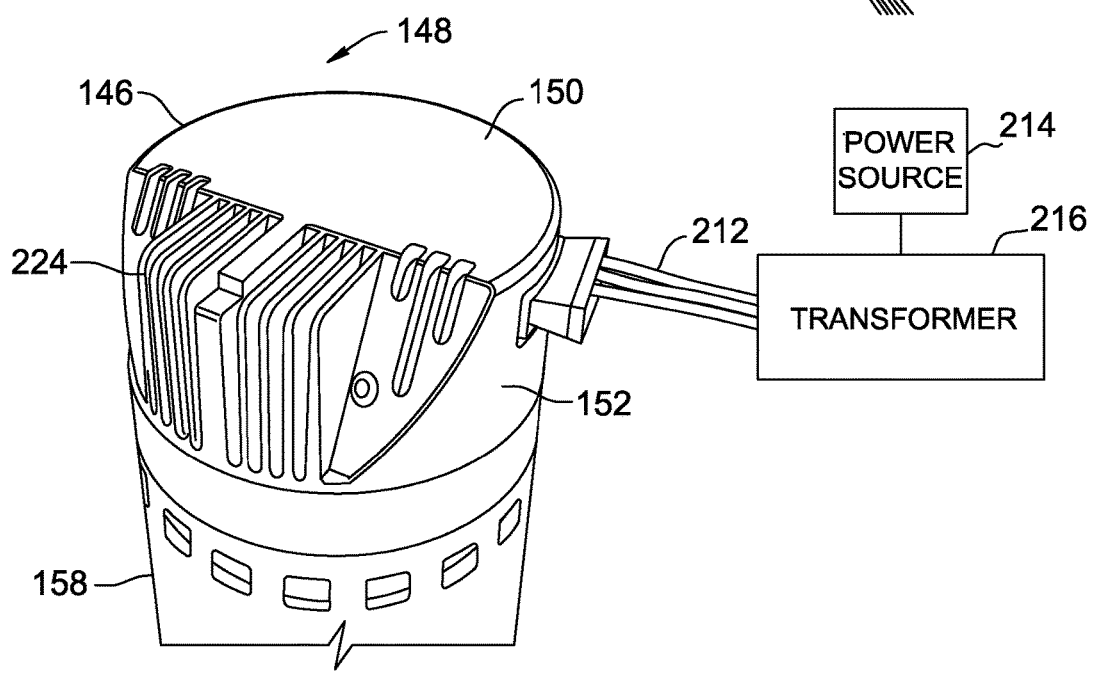
FIG. 4 is an assembled view of the known motor control assembly shown in FIGS. 1-3 coupled to the motor shown in FIG. 1.

FIG. 2 is a perspective view of motor control assembly 148. FIG. 3 is an exploded perspective view of a known motor control assembly 148. FIG. 4 is an assembled view of known motor control assembly 148 coupled to motor 100. In the exemplary embodiment, motor control assembly 148 includes electronics enclosure 146, which houses control system 102. Control system 102 includes a power supply module 200, which is generally defined by electronics enclosure 146, and an inverter module 202. Although power supply module 200, inverter module 202, and various other components of motor control assembly 148 are shown and described in a modularly packaged arrangement, the modules 200 and 202, any electrical component therein, and/or any other component of motor control assembly 148 may be arranged, oriented, and/or package in any suitable alternative arrangement.

Power supply module 200 includes an input connector 204 (which may be the same as or similar to connector 156, shown in FIG. 1), a plurality of electrical components 206, and an output connector 208 mounted on a component board, such as a printed circuit board (PCB) 210. Power supply module 200 integrates large through-hole electrical components and power connectors of control system 102. In the exemplary embodiment, PCB 210 is coupled to an interior surface of bottom wall 150 of electronics enclosure 146. Input connector 204 includes power input line connectors 212 for coupling to a power source.

Figure 5:
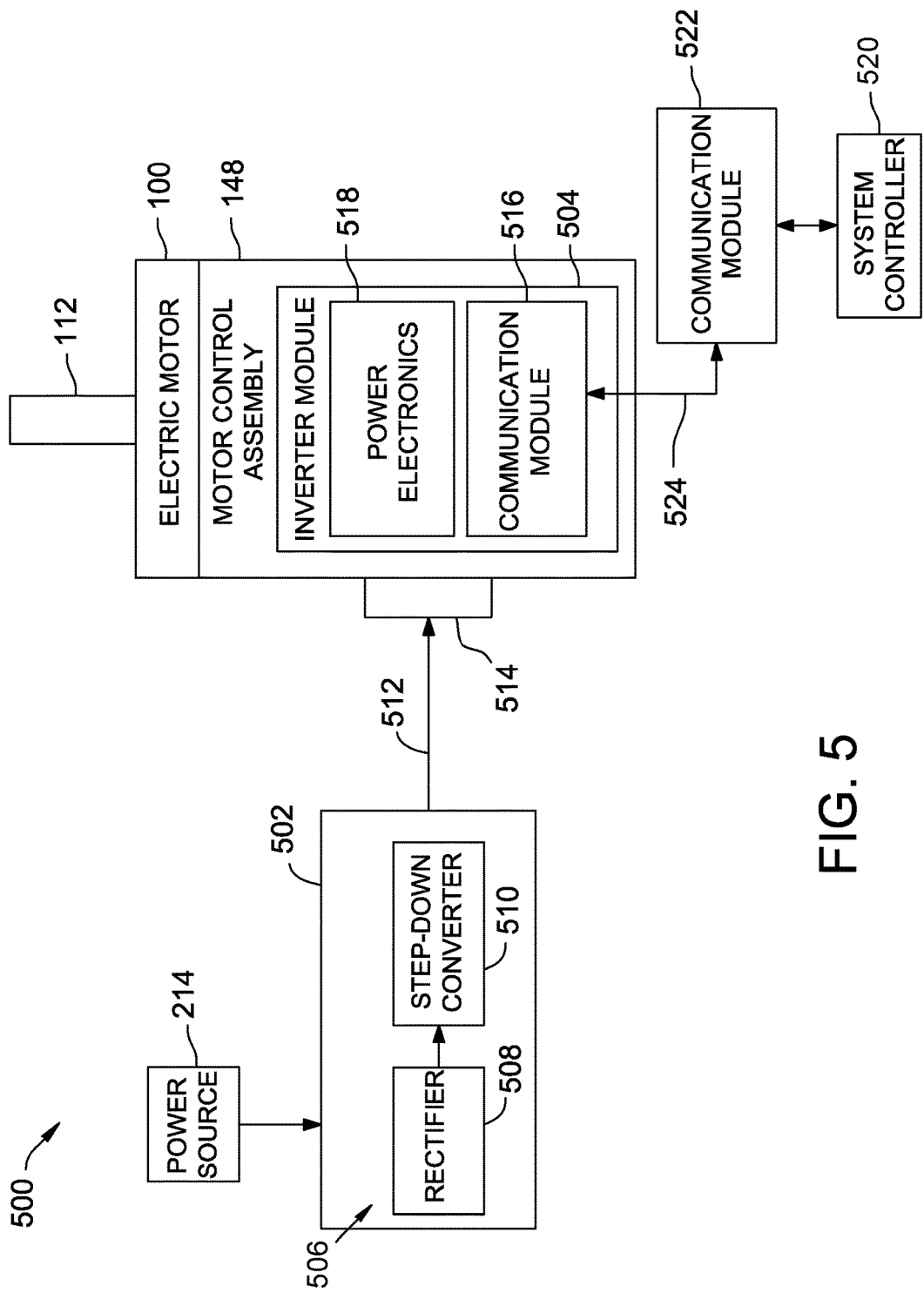
FIG. 5 is a block diagram of an exemplary motor control system for use with the electric motor shown in FIGS. 1-4.

In one embodiment, motor control assembly 148, specifically inverter module 202 is rated to receive up to an accepted level of direct current (DC) voltage for control of motor 100, referred to as a "rated voltage level." In some embodiments, the rated voltage level is a maximum DC voltage at which inverter module 202 (and/or other components of motor control assembly 148) is rated to operate. As such, certain components of motor 100 may be inoperable or may operate with higher failure rates at voltage levels higher than the rated voltage level. As shown in FIG. 5, motor 100 is operating with a power source 214 that supplies an alternating current (AC) line voltage. In the illustrated embodiment, the AC line voltage is higher than the DC-equivalent rated voltage level for motor 100. For example, power source 214 is an AC utility that provides AC input voltage of 575 VAC or about 600 VAC, or higher than about 500 VAC. The rated voltage level of motor 100 is about 230V or about 460V, or less than about 500V. Accordingly, to operate known motor control assembly 148, a transformer 216 is coupled between power source 214 and motor control assembly 148. Transformer 216 decreases the line voltage of power source 214 to a supported voltage (e.g., less than about 500 VAC, in the example above). Input connector 204 interfaces with and receives input power from transformer 216 via an opening in side wall 152 of electronics enclosure 146.

Electrical components 206, including, for example, thermistors, EMI chokes, electrolytic capacitors, and rectifiers, of power supply module 200 are configured to convert input voltage received from transformer 216 to a desired level of DC voltage, such as the rated voltage level. Layout of electrical components 206 is typically challenging with respect to EMI performance. Using output connector 208, power supply module 200 outputs the converted DC voltage to inverter module 202. In the illustrated embodiment, output connector 208 includes two high-voltage wires 218 for providing the converted DC voltage to inverter module 202. Any alternative connector that facilitate connection between power supply module 200 and inverter module 202 may be used. Alternatively, power supply module 200 and inverter supply module 202 may be directly hardwired to one another.

Inverter module 202 includes electrical components, as described further herein. Inverter module 202 further includes a heat-sharing package 220, including an insulated metal substrate 222 coupled to a metal heatsink 224 formed in side wall 152 of electronics enclosure 146. Heat-sharing package 220 includes external connections such as power connections, via an input/output connector 226. Input/output connector 226 enables power input of the DC power from power supply module 200 and power output of three-phase AC power to motor 100. To provide a minimization of connections, signal connections (e.g., for receiving control signals) may be made via a wireless connection to the system controller.

Inverter module 202 includes power semiconductors mounted on heatsink 224 and other components that generate heat as they switch power to the motor windings. Input/output connector 226 is coupled to high-voltage wires 218 for receiving the converted DC voltage from power supply module 200. Inverter module 202 converts the DC voltage to a three-phase AC voltage for driving electric motor 100 based on instructions received from an external device, for example, an HVAC system controller. Input/output connector 226 outputs the three-phase AC voltage to winding stages 136 of motor 100 via output power wires 228.

In alternative embodiments, power semiconductor switching devices may be embodied in, for example, and without limitation, an insulated-gate bipolar transistor (IGBT), a metal-oxide semiconductor field-effect transistor (MOSFET), a bipolar junction transistor (BJT), a gate turn-off (GTO) thyristor, an integrated gate-commutated thyristor (IGCT), a metal-oxide semiconductor (MOS) controlled transistor (MCT), or any other suitable thyristor, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

FIG. 5 is a block diagram of an exemplary motor control system 500. Motor control system 500 includes a power supply module 502 and an inverter module 504. Power supply module 502 may include, in some embodiments, the same or substantially similar components to those described above with respect to power supply module 200 (shown in FIGS. 2-4). Likewise, inverter module 504 may include the same or substantially similar components to those described with respect to inverter module 202 (also shown in FIGS. 2-4). However, in the example embodiment, power supply module 502 and inverter module 504 are modularly packaged, enabling the placement of power supply module 502 external to motor control assembly 148 and remote from inverter module 504.

In the illustrated embodiment, power supply module 502 is configured to receive AC power from power source 214. In the exemplary embodiment, power supply module 502 includes electrical components 506. Electrical components 506 include a rectifier 508 for converting the AC input line voltage from power source 214 to an equivalent DC voltage, and a DC-DC step-down converter 510 coupled to rectifier 508. DC-DC step-down converter 510 reduces the equivalent DC voltage to a level at or below the rated voltage level of motor control assembly 148, as described above. The resulting DC voltage 512 is provided to inverter module 202 through a connector 514. Connector 514 is defined in motor control assembly 148 and facilitates receiving input DC power supply 512 from the external, remote power supply module 502.

Electrical components 506 may include additional components, such as, for example, an inrush limiter for inrush current protection, an EMI choke for reducing EMI, and/or one or more capacitors to minimize voltage transients experienced during power switch operation. Power supply module 502 generally includes passive components having low rates of failure but may include one or more active components in any alternative embodiment.

Inverter module 504 is disposed within motor control assembly 148 of electric motor 100. Inverter module 504 includes a communication module 516 (e.g., a wired or wireless communication module) and power electronics 518. Power electronics 518 may include, for example, power switches and/or a digital signal processor (DSP) (e.g., a microcontroller or other suitable processor for executing a control algorithm to operate the power switches). Inverter module 504 receives DC voltage 512 at or below the rated voltage level from power supply module 502 through connector 514. Power electronics 518 switch the DC power 512 to the motor phases, converting the DC power to AC power. Power switches include, for example, IGBTs or other suitable semiconductor switches for switching DC power.

Inverter module 504 generally includes active components having higher rates of failure relative to those of components of power supply module 502. Accordingly, locating power supply module 502 remotely from inverter module 504 (i.e., remotely from motor control assembly 148) removes the more vulnerable components of inverter module 504 from the high AC voltage of power source 214. Moreover, any heat generated by electrical components 506 during the power conversion within power supply module 502 is also removed from proximity to inverter module 504. These benefits are realized without requiring modification of the rating, sizing, or spacing of any components of inverter module 504 or motor control assembly 148. In some embodiments, the size of motor control assembly 148 can even be reduced by locating power supply module 502 remotely therefrom.

Figure 6:
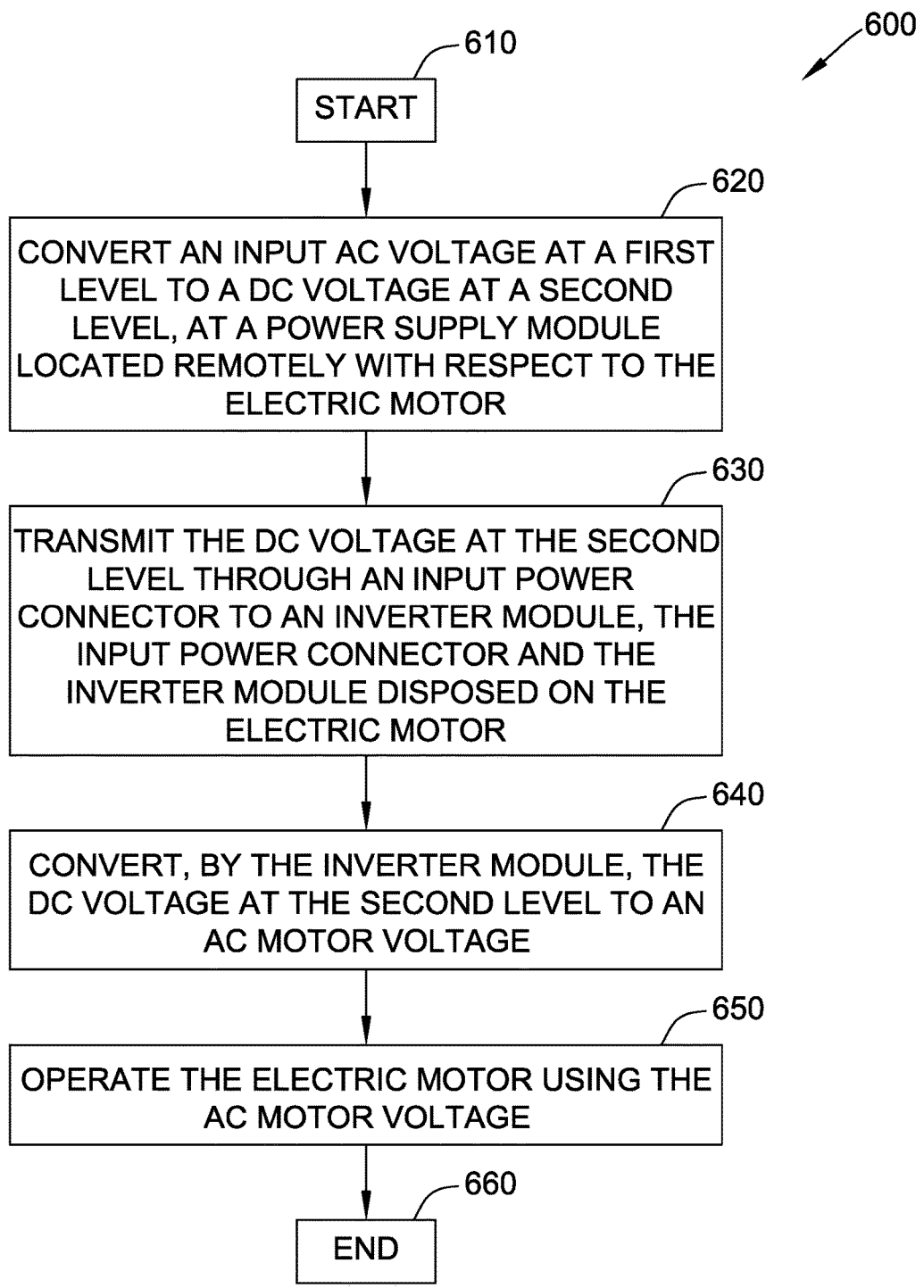
FIG. 6 is a flow diagram of an exemplary method of operating the electric motor shown in FIG. 5.

Motor control system 500 also includes a system controller 520 (e.g., a thermostat, an external programming device, etc.). System controller 520 communicates with electric motor 100 through a communication module 522 coupled to system controller 520. In certain embodiments, communication module 522 is integrated within power supply module 502. Communication module 522 communicates with inverter module 504 over a communication channel 524 through communication module 516. For example, system controller 520 transmits a motor command signal to inverter module 504 via communication module 522. In certain embodiments, communication module 522 is further configured to receive sensor data or any other data related to operation of drive motor 100. In the exemplary embodiment, communication module 516 converts a received signal into a control signal that power electronics 518 (e.g., a DSP) utilize to control operation of electric motor 100. FIG. 6 is a flow diagram of an exemplary method 600 of operating electric motor 100 for an HVAC appliance. Method 600 begins at a start step 610. At a rectification and conversion step 620, an input AC voltage is received at power supply module 200 and converted to a DC voltage. Power supply module 200 is located remotely with respect to electric motor 100. More specifically, power supply module 200 is not a component of motor control assembly 148, and not located within electronics enclosure 146. Power supply module 200 converts the input AC voltage at a first level to the DC voltage at a second level lower than a DC-equivalent voltage of the AC voltage at the first level. Specifically, rectifier 508 rectifies the input AC voltage and outputs the DC voltage at a DC-equivalent first level. For example, where the input AC voltage is about 600 VAC, the output from rectifier 508 is about 850 V (DC). It should be readily understood that the DC-equivalent voltage of the AC voltage at the first level ("a DC-equivalent voltage at the first level") may be any voltage level, dependent on, for example, what the input AC voltage is and what specific rectifying electrical components are used in power supply module 200 and, accordingly, these exemplary values are illustrative and non-limiting. Step-down converter 510 reduces the DC voltage from the DC-equivalent voltage at the first level to a DC voltage at the second level. In the exemplary embodiment, the second level is at most a rated voltage level for one or more components of motor control assembly 148 (e.g., inverter module 504). For example, where the input AC voltage is about 600 VAC (and the DC-equivalent voltage at the first level is therefore about 850 VDC), step-down converter 510 reduces the DC voltage to less than 600 VDC. Continuing with the same example, where the rated voltage level is about 230 VDC, step-down converter 510 reduces the DC voltage to about 230 VDC (or less).

At a transmission step 630, the DC voltage at the second level generated at power supply module 200 is transmitted to electric motor 100. The DC voltage is received at motor control assembly 148 via input power connector 514, which delivers the DC voltage at the second level to inverter module 202. Inverter module 202 is disposed within motor control assembly 148, which is further coupled to electric motor 100.

At a conversion step 640, inverter module 202 converts the DC voltage at the second level to an AC motor voltage. In certain embodiments, inverter module 202 includes a DSP that controls power switches to convert the DC voltage at the second level to the AC motor voltage. Electric motor 100 is operated using the AC motor voltage at an operation step 650. The method terminates at an end step 660.

Embodiments of the electric motors and electric motor control systems described herein provide a modular-packaged control system for fluid-moving systems, which may include refrigeration systems, HVAC appliances, pools, spas, and/or other appliances or system that implement a motor for a rotating component as described herein. More specifically, the modular-packaged control system separates the control system into two discrete housings. One housing includes an inverter module and a second housing includes a power supply module that serves as a front-end to the electric motor. The power supply module generally includes electrical components with relatively low failure rates. The electrical components convert and condition AC power from a power source to DC power to operate the electric motor. More particularly, in the example embodiment, the power supply module includes a step-down or buck converter to convert high-voltage input power to lower-voltage DC power that is supplied to power the motor. The other housing contains the inverter module, including active electrical components, such as, for example, power switches, one or more processors or digital signal processors (DSPs), and a wireless communication module. The components of the inverter module typically fail at a higher rate than the components of the power supply module.

Modular packaging of the inverter module and power supply module enables replacement of the modules separately. The inverter module and its housing are located on the electric motor within a motor control assembly or "motor housing." The power supply module may be located within the HVAC appliance, but remote from the electric motor itself, thus reducing the size requirements of the motor control assembly and, thereby, impedance of airflow. The motor control assembly and the various control circuitry components therein may be sized, spaced, or otherwise oriented according to lower-voltage standards while accepting a higher-voltage input power supply. Moreover, by locating the power supply module remotely, the heat-generating components therein are separated from the more heat-sensitive components within the motor control assembly. In addition, by housing the step-down converter in the power supply module, any motor control circuitry is isolated from the high-voltage power supply input.

The technical effects of the electric motors and electric motor control systems described herein include, for example, and without limitation: (a) enabling the use of smaller and less expensive motor control assemblies in locations with high line voltage power sources; (b) eliminating the need for expensive, bulky, and inefficient transformers to power motors with lower voltage ratings; (c) reducing the size of the motor control assembly while maintaining sizing and spacing requirements for inverter module electronic components; (d) removing heat generated in power conversion from inverter module electronic components; (e) separating high input voltage from the motor control assembly; (0 physically separating the power supply module from the electric motor; (g) reducing the airflow impedance created by the motor control assembly through the reduction in size of the motor control assembly and removal of bulky components from the airflow path; (h) improving efficiency of the system through reduced airflow impedance; (i) reducing cost of operation and maintenance of the electric motor through improved efficiency; (j) packaging motor control components together based on average failure rates; (k) reducing unnecessary component replacement through separate replacement of the power supply module and the inverter module; (l) reducing maintenance costs for the electric motor through reduced replacement components; (m) improving EMI and thermal performance of the electric motor through physical separation of the power supply module from the electric motor; and (n) improving power density of power supply module.

Some embodiments described herein relate to electric motors including electric motors and electronic controls. However, the methods and apparatus are not limited to the specific embodiments described herein, but rather, components of apparatus and/or steps of the methods may be utilized independently and separately from other components and/or steps described herein. For example, the methods may also be used in combination with any motor, and are not limited to practice with the electric motors as described herein. In addition, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements/components/etc. of the methods and apparatus described and/or illustrated herein, the articles "a," "an," "the" and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

What is claimed is:

1. A motor control system for operating an electric motor, said motor control system comprising:
   a power supply module disposed external to the electric motor and configured to convert an alternating current (AC) voltage at a first level to a direct current (DC) voltage at a second level lower than a DC-equivalent voltage of the AC voltage at the first level; and
   a motor control assembly coupled to the electric motor, said motor control assembly comprising:
      an input power connector configured to receive the DC voltage at the second level from said power supply module; and
      an inverter module coupled to said input power connector, said inverter module configured to convert the DC voltage at the second level to an AC motor voltage to operate the electric motor.

2. The motor control system of claim 1, wherein said power supply module is located remotely with respect to said motor control assembly.

3. The motor control system of claim 1, wherein said motor control assembly has a rated voltage level defining a maximum voltage level at which the motor control assembly operates, and wherein the first level of the AC voltage is higher than the rated voltage level.

4. The motor control system of claim 3, wherein the second level of the DC voltage is at most the rated voltage level.

5. The motor control system of claim 1, wherein said power supply module comprises a rectifier configured to convert the AC voltage to the DC voltage at the DC-equivalent voltage at the first level, and a DC-DC step-down converter coupled to said rectifier and configured to reduce the DC voltage to the second level.

6. The motor control system of claim 1, wherein the first level is greater than about 500 VAC and the second level is at most about 500 VDC.

7. The motor control system of claim 1, wherein the first level is about 460 VAC and the second level is at most about 320 VDC.

8. The motor control system of claim 7, wherein the second level is at most about 230 VDC.

9. A method of operating an electric motor, said method comprising:
- converting an input alternating current (AC) voltage at a first level to a direct current (DC) voltage at a second level lower than a DC-equivalent voltage of the AC voltage at the first level at a power supply module located remotely with respect to the electric motor;
- transmitting the DC voltage at the second level through an input power connector to an inverter module, the input power connector and the inverter module disposed on the electric motor;
- converting, by the inverter module, the DC voltage at the second level to an AC motor voltage; and
- operating the electric motor using the AC motor voltage.

10. The method of claim 9, wherein the inverter module has a rated voltage level defining a maximum voltage level at which the electric motor operates, and wherein said converting the AC voltage to the DC voltage at the second level further comprises converting the AC voltage at the first level, wherein the first level is higher than the rated voltage level, to the DC voltage at the second level, wherein the second level is at most the rated voltage level.

11. The method of claim 9, wherein said converting the AC voltage at the first level to the DC voltage at the second level comprises:
- converting the AC voltage to the DC-equivalent voltage at the first level using a rectifier; and
- reducing the DC voltage from the first level to the second level using a DC-DC step-down converter coupled to the rectifier.

12. The method of claim 9 further comprising:
- receiving a signal through a first communication module coupled to the inverter module; and
- converting the DC voltage at the second level to the AC motor voltage according to the received signal.

13. A fluid-moving system, comprising:
- a power supply module configured to convert an alternating current (AC) voltage at a first level to a direct current (DC) voltage at a second level lower than a DC-equivalent voltage of the AC voltage at the first level;
- an electric motor configured to turn a rotating component to generate a fluid flow; and
- a motor control assembly coupled to said electric motor, said motor control assembly comprising:
  - an input power connector configured to receive the DC voltage at the second level from said power supply module; and
  - an inverter module coupled to said input power connector, said inverter module configured to convert the DC voltage at the second level to an AC motor voltage to operate said electric motor.

14. The fluid-moving system of claim 13, wherein said power supply module is located remotely with respect to said electric motor.

15. The fluid-moving system of claim 13, wherein said motor control assembly has a rated voltage level defining a maximum voltage level at which the electric motor operates, and wherein the first level of the AC voltage is higher than the rated voltage level.

16. The fluid-moving system of claim 15, wherein the second level of the DC voltage is at most the rated voltage level.

17. The fluid-moving system of claim 13, wherein said power supply module comprises a rectifier configured to convert the AC voltage to the a DC-equivalent voltage at the first level, and a DC-DC step-down converter coupled to said rectifier and configured to reduce the DC voltage to the second level.

18. The fluid-moving system of claim 13, wherein the first level is greater than about 500 VAC, and the second level is less than about 500 VDC.

19. The fluid-moving system of claim 13, wherein the first level is about 600 VAC, and the second level is at most about 320 VDC.

20. The fluid-moving system of claim 19, wherein the second level is at most about 230 VDC.

* * * * *